United States Patent [19]

Willemin

[11] Patent Number: 4,459,655

[45] Date of Patent: Jul. 10, 1984

[54] CONTROL SYSTEM FOR A MACHINE OR FOR AN INSTALLATION

[75] Inventor: Paul Willemin, Bassecourt, Switzerland

[73] Assignee: Willemin Machines S.A., Berne, Switzerland

[21] Appl. No.: 247,367

[22] Filed: Mar. 25, 1981

[30] Foreign Application Priority Data

Mar. 27, 1980 [CH] Switzerland ................. 2441/80

[51] Int. Cl.³ .................. G06F 15/46; G06F 15/16
[52] U.S. Cl. ............................ 364/132; 364/171; 364/200
[58] Field of Search ............. 364/131, 132, 133, 134, 364/200 MS File, 900 MS File

[56] References Cited

U.S. PATENT DOCUMENTS

| | | | |
|---|---|---|---|
| 4,069,488 | 1/1978 | Fiorenza et al. | 364/474 |
| 4,091,448 | 5/1978 | Clausing | 364/200 |
| 4,133,027 | 1/1979 | Hogan | 364/200 X |
| 4,149,238 | 4/1979 | James et al. | 364/200 |
| 4,149,242 | 4/1979 | Pirz | 364/200 |
| 4,181,974 | 1/1980 | Lemay et al. | 364/200 |
| 4,251,858 | 2/1981 | Cambigue et al. | 364/132 |
| 4,281,379 | 7/1981 | Austin | 364/132 |
| 4,313,162 | 1/1982 | Baun et al. | 364/200 |

FOREIGN PATENT DOCUMENTS

| | | |
|---|---|---|
| 1360470 | 7/1974 | United Kingdom . |
| 1493878 | 11/1977 | United Kingdom . |
| 1495793 | 12/1977 | United Kingdom . |
| 1497158 | 1/1978 | United Kingdom . |
| 1512379 | 6/1978 | United Kingdom . |
| 2049243 | 12/1980 | United Kingdom . |

OTHER PUBLICATIONS

Braun et al–"Parallel Processing with Minicomputers Increases Performance, Availability"–*Electronics*, Jul. 5, 1979, pp. 123–127.

Braun et al–"Paralleled Slaves Boost Throughput of Minicomputers"–*Electronics*, Jul. 19, 1979, pp. 125–129.

*Feltron Microcomputer-Information*, "Microcomputer System 802 Von Panel", Gruppe 6.2/Panel/78-0-7-15/Seite 1.

*Feltron Microcomputer Information*–"Modular Microcomputer"–Gruppe 6.2/Microsystems/76-03-08/Seite 1.

*Intel Corporation*–"Presenting The New Intel ICS TM Industrial Control Series", ©1979.

Primary Examiner—Joseph F. Ruggiero
Attorney, Agent, or Firm—Silverman, Cass & Singer, Ltd.

[57] ABSTRACT

A control system comprises several slave modules each operative to control a specific function and a master module operative to control all the slave modules. Each slave module comprises a processing circuit cooperating with an input/output interface permitting conversation with the operator and a memory circuit intended to specify the function which must be controlled by the slave module. The master module comprises a processing circuit cooperating with a memory for the conversation software and for processing the information received by the slave modules, and with an input/output interface permitting conversation with the operator. All the modules are interconnected on the one hand by a conversation bus between the modules and, on the other hand, by a master bus which enables the master module to read directly into a memory of each slave module the additional software necessary for conversation with the slave module.

3 Claims, 6 Drawing Figures

CONTROL SYSTEM FOR A MACHINE OR FOR AN INSTALLATION

BACKGROUND OF THE INVENTION

1. Field of the invention

The present invention relates to a control system for a machine or for an installation and comprising a master module and several slave modules, the master module being operative for overall control of the complete system and the slave modules operative to control specific functions.

2. Description of the Prior Art

Such systems are already known with multiprocessing in which each slave module has the software relating to the function it controls and the master module has the software which permits it to converse with all the slave modules for overall control of the control system. In these known systems, it is impossible to add a slave module of a new type without having to reconsider all the software. Moreover, these known multiprocessing systems are slow in operation since, each time a module wants to call, it must first fill up a general memory, to advice the called module that it has a message for it, the latter module emptying the memory and processing the information received then giving its response while filling anew the general memory, advising the calling module, etc.

SUMMARY OF THE INVENTION

The object of the invention is to overcome the above-mentioned drawbacks constituted on the one hand by the difficulty of adding a new slave module to the system while obliging each time the operator to review the master software and, on the other hand, by the relatively slow operation of the system.

According to the invention, a control system of the type concerned is distinguished by the fact that each slave module comprises means enabling it to store the portion of the software which the master module requires to converse with it and for processing the information received.

In other words, each slave module places at the disposal of the master module the portion of software enabling the control of this slave module by the master module.

Other features of the invention will be apparent from the following description, drawings and claims, the scope of the invention not being limited to the drawings themselves as the drawings are only for the purpose of illustrating a way in which the principles of the invention can be applied. Other embodiments of the invention utilising the same or equivalent principles may be used and structural changes may be made as desired by those skilled in the art without departing from the present invention and the purview of the appended claims.

DESCRIPTION OF PRIOR SYSTEM AND PREFERRED EMBODIMENT

Figure 1:
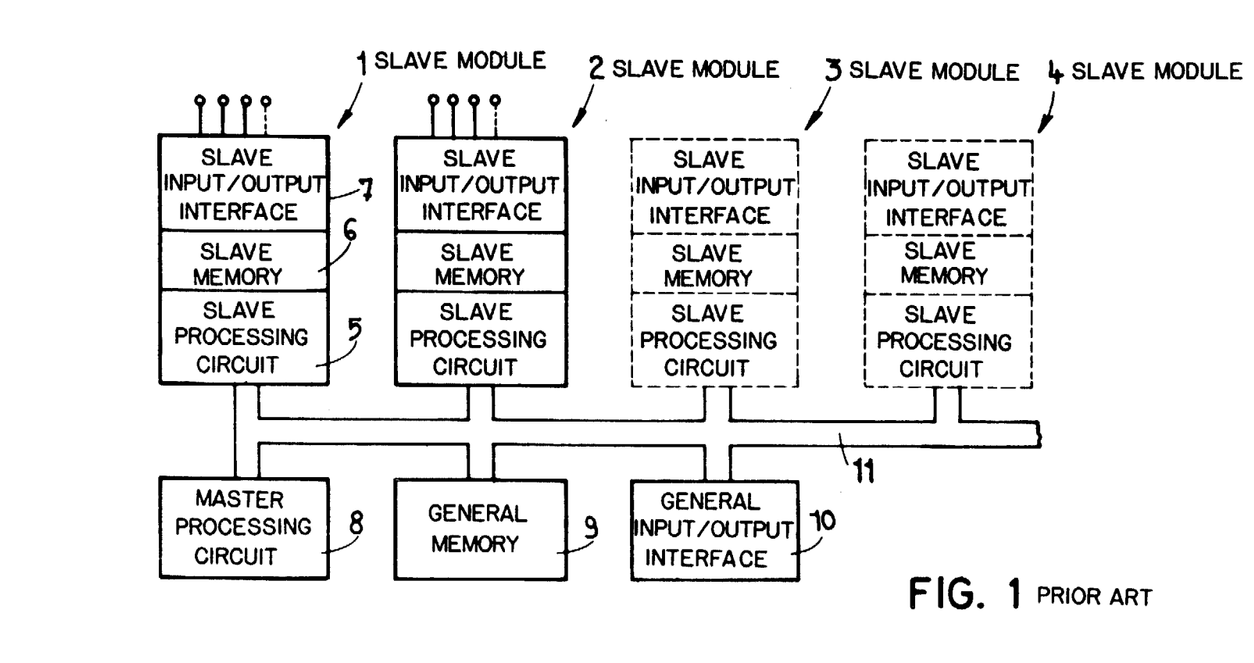
FIG. 1 is the block-diagram of a known multiprocessing system.

The block-diagram of FIG. 1 illustrates, for the purpose of comparison, a known control system for a machine-tool or for an installation and which comprises several slave modules 1, 2, 3, 4 . . . . Each of these slave modules is intended to control a specific element of the machine-tool. For example, in a milling machine such elements might be a motor for feeding the table along the X-axis, a motor for feeding the table along the Y-axis, a motor for feeding the spindle, etc. Each of these modules 1–4 comprises a slave processing circuit 5, a slave memory 6 which stores the data relating to the control of the corresponding controlled machine element and an input/output interface 7 providing the connection between the module and the corresponding controlled element. For ensuring the synchronization of all these slave modules, the system comprises moreover a master processing circuit 8, a general memory 9 and a general input/output interface 10, the system elements being interconnected by a general bus 11. Each time one of the slave modules wants to converse with another slave module, it must first load the general memory and advise the called module that a message awaits it. The called module unloads the memory, analyzes the information, then gives its response while reloading the general memory and notifying the first caller, etc. It is obvious that such a process is slow. But a greater drawback of this system lies in the fact that the master processing circuit 8, the general memory 9 and the general interface 10 must provide from the start all the possibilities given by a variable number of slave modules, which requires a computer language which is not available to the operator of the machine-tool and, particularly, prevents the manufacturer from increasing or decreasing the capacity of the system without considerable modification of the installation.

Figure 2:
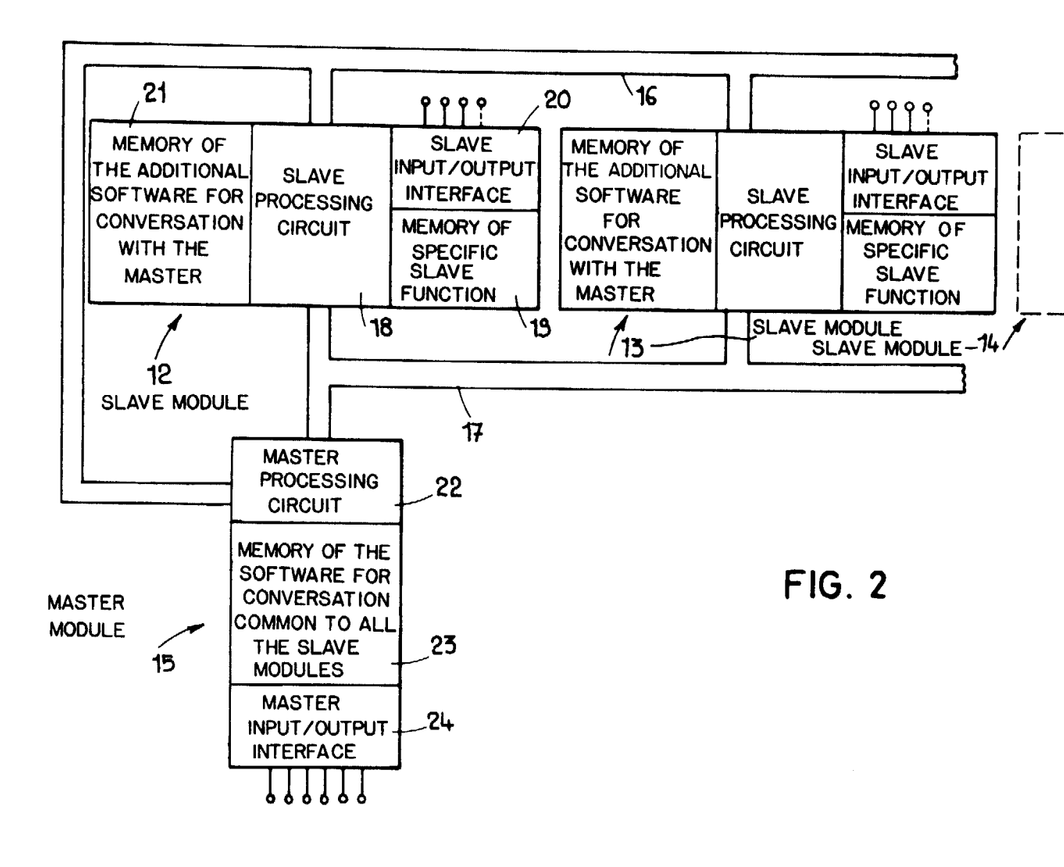
FIG. 2 is the corresponding block-diagram of a multiprocessing control system representing a preferred embodiment of the invention.

FIG. 2 is a block-diagram illustrating the preferred embodiment of the present invention. The system illustrated comprises slave modules 12, 13, 14 and a master module 15, all the modules being interconnected by a conversation bus 16 and by a master bus 17 providing a connection between the master module and the slave modules. Each slave module comprises a slave processing circuit 18, a memory 19 relating the specific slave function and a slave input/output interface 20, these three parts substantially corresponding to parts 5, 6, 7 of FIG. 1. Additionally, each slave module comprises a memory 21 for the additional software required for conversation with the master that, as its name indicates, is intended to include the part of the conversation software individual to the particular slave module. The master module 15 comprises a master processing circuit 22, a memory 23 for the software required for conversation with the modules which is common to all these modules, as well as a master input/output interface 24. Thus, consequently, the portion of the conversation software common to all the slave modules is included in the master memory, while the portion of this software which is individual to a specific slave module is included in that slave module itself. Thus, if it is desired to develop from a simple device comprising few slave modules to a device comprising more thereof, it is sufficient to load the additional conversation software into the supplementary slave modules, where the master module will look for it.

Figure 3A:
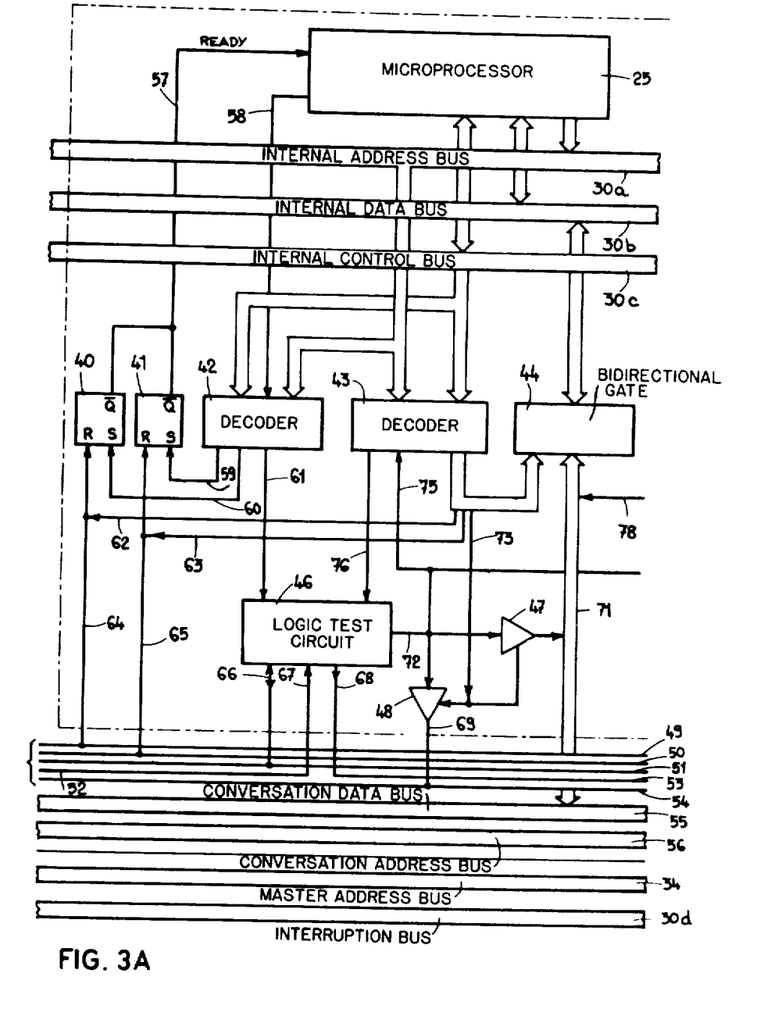
FIGS. 3A and 3B together illustrate the block-diagram of a module of the system of FIG. 2.
Figure 3B:
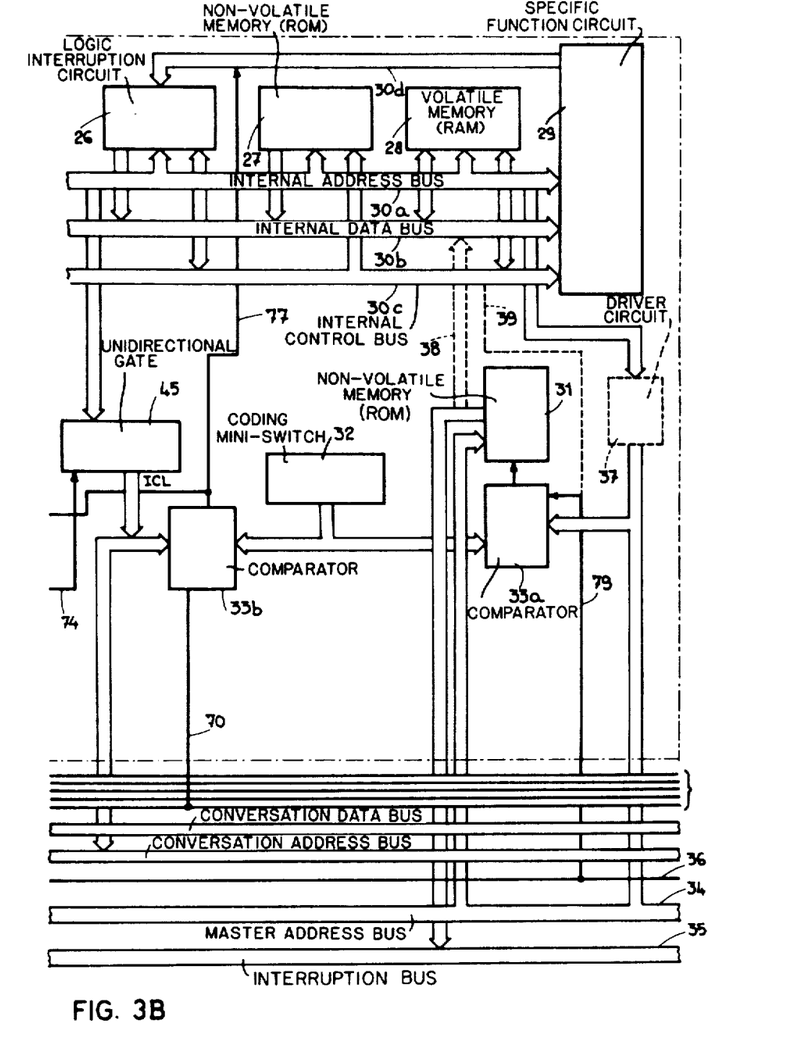

FIGS. 3A and 3B together illustrate the block-diagram of a module, the parts in broken lines concerning only a master module and not being included in the slave modules.

The modules comprise a processing circuit having a microprocessor 25, a logic interruption circuit 26, a non-volatile memory (ROM) 27, a volatile memory (RAM) 28 and a specific function circuit 29, these elements being connected by an internal address bus 30a, an internal data bus 30b, an internal control bus 30c and an internal interruption bus 30d. All the buses 30a to 30d hereabove mentioned are within the module and, consequently, do not appear on FIG. 2. The specific function circuit renders the module concerned a control member for a particular device. This circuit is merely the interface between the microprocessor of the module and the final member of the particular controlled device.

The memory of the additional software required for conversation with the master module, which is indicated by 21 in FIG. 2, is constituted by a non-volatile memory (ROM) 31 (FIG. 3B) where it can be seen that it cooperates with a coding mini-switch 32 and with a first comparator 33a, a second comparator 33b being specific to the inter-modules conversation only. The elements 31 and 33a of the several modules are connected to each other by a master bus 34, a master data bus 35 and a memory control line 36, these three elements being represented together in FIG. 2 by the bus 17. In the case where the module illustrated is a master, it is clear that its internal buses 30a, 30b, 30c are connected to the corresponding external buses 34, 35, 36 by a driver circuit 37, a bus 38 and control line 39. Thus it can be seen that the additional software for conversation with the master can be communicated to the latter, from the non-volatile memory 31 of the slave module to the master processor only, during its request for instructions. Likely, the master module can communicate the addresses and the order of reading of memory by the circuit 37, the master addresses bus 34 and the lines 36 and 39.

In order to provide for direct conversation between modules, the circuit of each module comprises two flip-flops RS 40, 41, two decoders 42, 43, a bidirectional gate 44, a unidirectional gate 45, a logic test circuit 46 and two tristate gates 47, 48. These elements are interconnected with each other on the one hand and, by six control lines 49, 50, 51, 52, 53, 54, a conversation data bus 55 and by a conversation address bus 56, with the other modules, on the other hand. The elements 49 to 56 are, as can be seen from FIG. 3, external to the modules and constitute actually the conversation bus 16 illustrated in FIG. 2 for the direct connection of the slave modules to each other.

The interconnection of the elements inside the modules is as follows: the circuit 25 receives a "ready" signal from the outputs $\overline{Q}$ of the flip-flops 40 and 44, via a line 57, and itself applies a $\overline{STROBE}$ signal to the decoder 42, via a line 58. The decoder 42 applies a signal $\overline{ACWR}$ to the input S of the flip-flop 41, via a line 59, a signal $\overline{ACRD}$ to the input S of the flip-flop 40, via a line 60, and a signal $\overline{ACT}$ to the test circuit 46, via a line 61. The decoder 43 sends to the inputs R of the flip-flops 40 and 41 of the other modules signals $\overline{CWR}$ and CRD, via lines 62, 64, 49, and 63, 65, 50 respectively. The test circuit 46 receives and/or outputs signals CBUSY, SLI and SLO on lines 66, 67, 68, respectively, signals which are also applied to the corresponding inputs of the circuit of all the modules by the bus lines 51, 52, 53, the sixth line 54 of the control bus receiving a signal $\overline{CINT}$ via a line 69 from the tristate gate 48. Concerning the bus lines 52 and 53, it is to be noted that they can be considered as portions of the same line between which the input 67 and output 68 are series connected, the input signal SLI received by the line 52 being constituted by the output signal SLO of the upstream connected module, and the output signal SLO transmitted by the line 53 constituting the input signal SLI received by the downstream connected module. The signals $\overline{CINT}$ from the gates 48 of all the modules are applied to the comparator 33b of all the modules via a line 70. The tristate gate 47 applies an output signal $\overline{CINT}$ to a bus 71 connecting the gate 44 to the external bus 55, the two gates 47 and 48 being controlled by two input signals $\overline{COST}$ and $\overline{RCT}$ transmitted respectively by the test circuit 46 and by the decoder 43 on lines 72 and 73, respectively. This signal $\overline{COST}$ is also applied to the gate 45 via a line 74 and to the decoder 43 via a line 75, the latter applying a signal $\overline{CEND}$ to the circuit 46, via a line 76. The comparator 33b outputs a signal ICL which is introduced into the bus 30d via a line 77 and into the bus 71 via a line 78. The comparator 33a receives, via a line 79, a signal $\overline{MEMR}$ and a corresponding signal via the line 39 when it is the master module which is being considered.

The operation of the control system is as follows: the internal lines and buses of the modules ensure communication with the corresponding specific function circuit 29; the interruption bus 30d by enabling the specific function circuit 29 to interrupt the circuit 25 in its work for an important communication; the internal address bus 30a by enabling the circuit 25 to write or to read in a determined member of the circuit 29; the data bus 30b by carrying the conversation "words" between the circuit 25 and the circuit 29; and the internal control bus 30c by allowing control of the conversation between the circuit 25 and the circuit 29.

The buses and external lines permit communication between the modules, the lines 49 to 54 providing for the control of the calls and of conversations between the modules, the address bus 56 by enabling the conversation mode of the called module, and the data bus 55 by carrying the conversation words between the modules, the master address bus 34 enabling reading by the master module of its software contained in the slave modules, the master data bus by carrying the words of the master software, and the line 36 by providing access at the appropriate moment to the memory 31 which is read. A reset line (not illustrated) provides during switching on of the machine, for the switching on of all the elements.

The additional software for conversation with the master module, which is included in each of the slave modules, is contained in the non-volatile memory 31; it is for this reason that, when the module illustrated in FIG. 3 is a slave module, the broken-line connections have to be omitted, the memory 31 being read by the outer master data bus 35. The memory 31 responds to a call when the address transmitted to the master address bus 34 corresponds to the address of the called module, which is indicated in the coding mini-switch 32, the comparison being effected in the comparator 33a. Consequently, the code introduced into the mini-switch provides for differentiation of each module, as well for a master slave conversation and for a conversation between slaves. In the case of the master module, the bus 38 and the line 39 are in operation as well as the driver circuit 37; hence, this module will be the master of the address bus and, consequently, of all the non-volatile memories 31.

Figure 4:
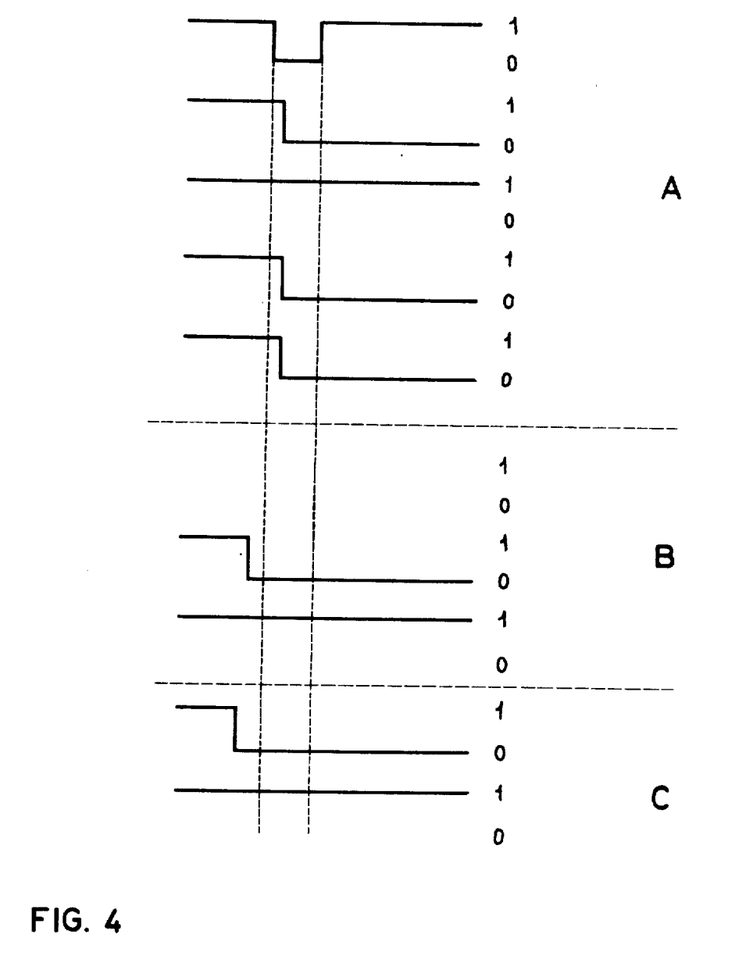
FIG. 4 is a diagram representing several signals which appear in the illustrated circuits.

FIG. 4 represents in detail the role of several signals in a conversation between slave modules, at A when in line 51 for the signal CBUSY (Conversation Running) is free at the moment of the call, at B in the case where the line is free but where two calls are produced simultaneously, and at C in the case where the line is busy at the moment of the call.

A conversation is requested by the treatment circuit 25 in a single machine cycle, the circuit 25 sending to the input/output decoder 42 an input/output reading signal (not illustrated) through the intermediary of the control bus 30c. As soon as this signal appears, at the commencement of the machine cycle, the decoder 42 outputs a signal $\overline{ACT}$ (Advance Conversation Test) on the line 61, which produces an instantaneous response by the test logic circuit 46.

If the line 51 is not busy (case of FIG. 4A), the signal CBUSY (Conversation Busy) is at logic "1". In the short time that follows, and if the line SLI (Security Line In) is also at "1", the signal CBUSY falls to logic "0" on the command of circuit 46 for indicating that a conversation has been established and the signal SLO (Security Line Out) also falls to "0" on the command of circuit 46 to ensure that no module downstream has been able to come simultaneously into conversation. From this time on, the circuit 46 operates to change to "0" the signal $\overline{COST}$ (Conversation Start) of line 72 thus indicating to the processor circuit 25 that the conversation is established, as will clearly appear later. In the case where the lines are busy at the time of the call (FIG. 4C) the signal $\overline{ACT}$ produces, on the lines and at the circuit 46, no modification and the signal $\overline{COST}$ remains at "1", indicating to the circuit 25 that the conversation is not established. This signal $\overline{COST}$ remains present during the whole conversation and, as soon as it appears, results in the application to the address bus 56 of the addresses of the called module, while acting on the gate 45 through the line 74. As a result the gate 45 is open, which results in an immediate discharge of the called module so far as its ability to enter into conversation is concerned, this called module having the possibility, for instance, to be protected against interruption. A fraction of μs after the appearance of the signal $\overline{ACT}$, the decoder 43 outputs a signal $\overline{RCT}$ (Read Conversation Test) on the line 73. During this signal, the processor circuit 25 stores the information present on its own data bus 30b. The functions of the pulse $\overline{RCT}$ are multiple. We have simultaneously:

1. Transmission through the gate 48 of a signal $\overline{CINT}$ (Conversation Interrupt) on the line 69 and the value of which is "0" produces, at the module responding to the address called by the gate 45, a requisition for interruption. Thus, as "0" appears on the line 70 of the called module, and if the comparator 33b recognizes an equality between the address received from the bus 56 on the one hand and from the coding switch 32 on the other hand, and so far as the circuit 25 of the called module allows the interruption, the comparator 33b produces a signal $\overline{ICL}$ (Interrupt Conversation Line) of "0" value, on the lines 77 and 78, thus placing the processor circuit 25 of the called module in interruption (Interrupt) and preparing the discharge onto the bus 55 to the command of the circuit 25 of the calling module.

2. While opening the gate 47, the signal $\overline{RCT}$ introduces on a bit of the bus 55 the discharge according to which the conversation is engaged.

3. The signal $\overline{RCT}$ transmitted directly from the decoder 43 to the bidirectional gate 44 by the bus connecting them opens that gate so as to connect the bus 55 on the bus 30b, in the calling module.

4. Finally, at the end of the signal pulse $\overline{RCT}$, the calling circuit 25 stores the information transmitted by the gate 44, which enables the latter to interpret immediately the two bits of discharge, identifying at the same time whether the conversation is connected and whether the called processor circuit 25 is ready for the conversation.

If, on the contrary, during the passage of the signal pulse $\overline{ACT}$, the conversation has not been able to be established (case of FIGS. 4B and 4C), the signal $\overline{COST}$ remains at "1" and the decoder 43 cannot generate the signal $\overline{RCT}$. There will in this case be no request of interruption and the gate 43 will remain closed. The calling circuit 25 will read in anyway the output of the gate 44 which will furnish thereto only the signal "1" and thus will form the conclusion that the conversation is not established.

It is to be appreciated that everything which has been described occupies only one machine cycle.

Let us now assume that the conversation has been established. This means first that each of the two modules is executing the program controlling this conversation: the calling module, since it has itself chosen to do so and the called module since it has been obliged to do so after the interruption request has been received. It is clear that these two programs must have been conceived so as to realize the same conversation.

For illustrating what will occur, let us imagine a very simple conversation: the calling module X sends information, from which it awaits the response, to the called module Y.

Let us consider first the module X; it must send its message and will do so through the intermediary of the signal pulse $\overline{ACWR}$ on the line 60 and of the signal pulse $\overline{CWR}$ on the line 62. The signal $\overline{ACWR}$ will, as soon as it appears and owing to the flip-flop 41, prepare the circuit 25 which is placed in awaiting mode which will become effective as soon the signal pulse $\overline{CWR}$ appears which opens the bidirectional gate in the sense of the circuit 25 of module X for outward transmission. The message is then routed in the direction of the circuit 25 of module Y.

Let us leave the circuit 25 of module X in awaiting mode, and let us consider the condition of the module Y: the latter, from its program controlling this conversation, knows that it must be open to receive at the command of the module X. It does so through the intermediary of the signal pulses $\overline{ACRD}$ (Advanced Conversation Read) on the line 60 and $\overline{CRD}$ (Conversation Read) on the line 65. The signal $\overline{ACRD}$, as soon as it appears and owing to the flip-flop 40, prepares the circuit 25 of the module Y which is also placed in awaiting mode. The awaiting commences at the start of the signal pulse $\overline{CRD}$, which opens the gate 44 in the outward sense towards the circuit 25 of module Y.

Now, the two processor circuits 25 are in awaiting mode. The signal pulse $\overline{CWR}$ of the module X, which is present during the whole awaiting period, is sent, through the external line 49, to the flip-flop 40 of the module Y. This flip-flop, precisely, prevents the module Y continuing to work and this signal pulse $\overline{CWR}$ from the module X will reset to "0" the output $\overline{Q}$ of the flip-flop 40 and will allow the module Y to continue working. In the same way, the signal pulse $\overline{CRD}$ from the module Y and which is present during the whole awaiting time of the latter reaches the flip-flop 41 of the module X, and is operative to prevent this module from continuing to work. The signal pulse $\overline{CRD}$ of the module Y results in the module X continuing working.

Thus we see that whatever the delay or the advance of the two processor circuits 25 one with respect to the other may be, as soon as a word is to be passed, they will mutually await on each other. When the circuits 25 of the two modules are able to transmit and to receive, respectively, they will very naturally pass the message.

Summarizing, as soon as a circuit 25 wishes to transmit or receive a word, it automatically locks itself; it will be released by the other circuit 25 as soon as the latter is ready to receive or transmit, respectively.

This consequently permits, in a single machine cycle, the transmission of a word, since each circuit 25 treats separately the message passed and resumes its position ready for exchange of information without taking into account the instantaneous state of its partner since, in any case, the message will pass as soon as each has completed the small work with which it is busy.

The conversation will be terminated as soon as the software of the calling module will decide, by a mere machine cycle furnishing a pulse providing a signal $\overline{CEND}$ (Conversation End).

Figure 5:
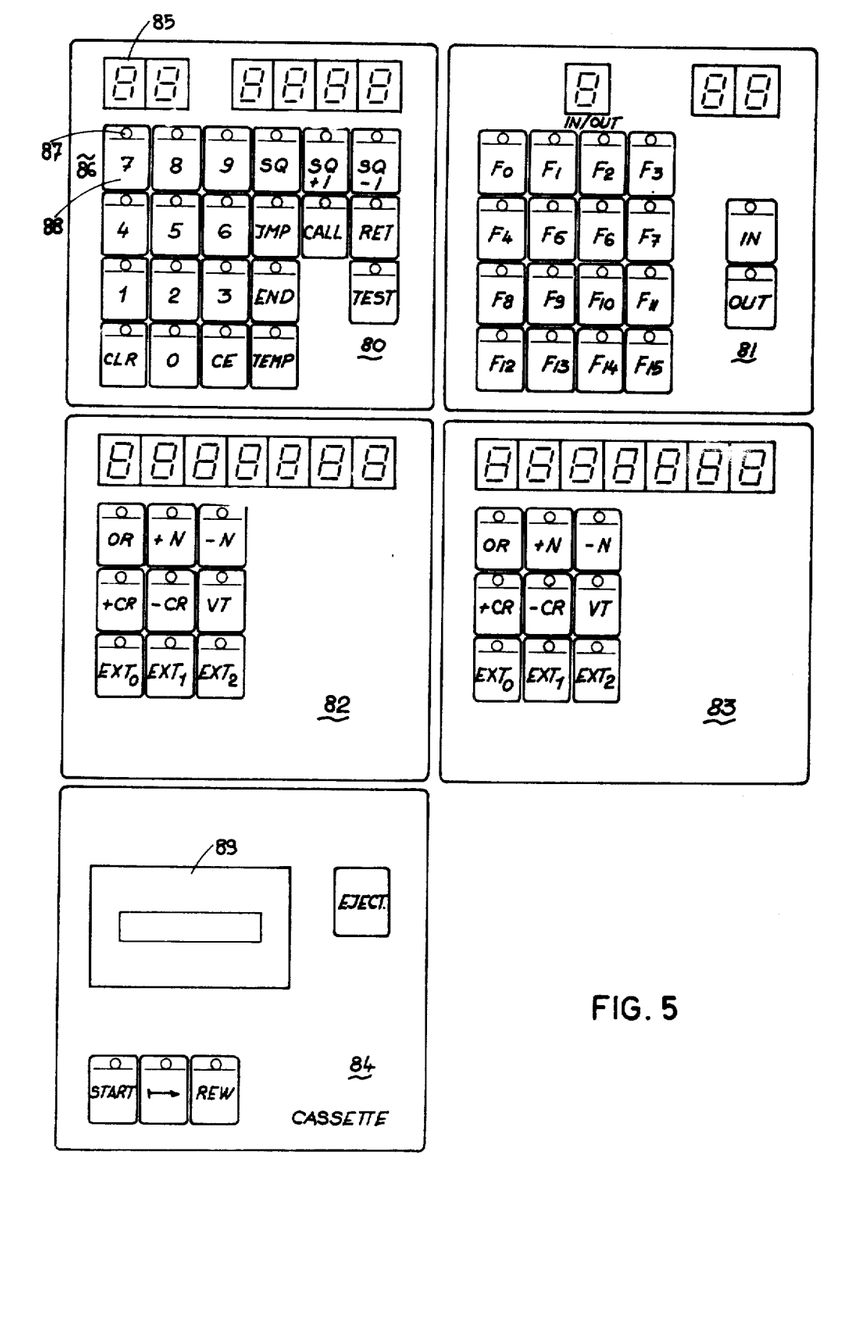
FIG. 5 illustrates an example of the utilization of the system for the control of a machine-tool.

FIG. 5 illustrates an example of use of the system in the control of a machine having a program wherein a carriage of the machine, driven by two motors, is moved to any point with coordinates X, Y for effecting several machine operations.

The system comprises five modules located in drawers only the front panels of which have been illustrated. These panels carry the interfaces providing for conversation with the operator, and the modules are:

A master module 80 operative for the generalized control of the program.

A function module 81 intended to switch on or switch off several functions such as valves, pumps, lamps, relays, etc.

Two control modules 82 and 83 for controlling the two feed motors for movement of the carriage along the X-axis, and the Y-axis, respectively.

A cassette tape module 84 operative to read the program information from the magnetic tape.

The front panels of the drawers are standardized so as to allow for the arrangement of seven display elements at the maximum, at the top of the board, and of a key board of twenty-four control keys at the maximum, these elements corresponding to the interface input/output 24 of FIG. 2. The display elements 85 are constituted by LED having seven segments and the control keys 86 carry an indicator 87 and an indication 88 relating to their function.

The MASTER drawer 80 carries a numeric key board comprising ten keys respectively marked 0 to 9 and serving to introduce a number into the device, during programming, the other drawers 81 to 84 having no numeric key board.

In the following specification, the other keys of the drawer 80 are designated by the indications which they carry. They serve, during programming:

SQ for the positioning of a determined sequence
SQ+1 for the incrementation of a sequence counter
SQ−1 for the decrementation of this counter
Jmp to introduce a jump from one sequence to another
CALL to introduce repetitive sub-programs, into the working program of a workpiece, for example for effecting a calculation
RET to abandon a repetitive sub-program and resume the main program
END to indicate the end of the program
TEST to control the execution of a program fictionally merely by simulation of the appropriate displays
TEMP to introduce a time delay, once the sequence is ended, before passing to the next one
CLR to cancel the total content of a sequence to effect, for example, a correction
CE to cancel only the last order which has been introduced Finally, the display is divided into two groups, one marked OPER, for designating the number of the operation JUMP, CALL, RET, etc . . . , and the other, marked SEQUENCE, composed of four LED numerals by which is displayed the number of the sequence in which is effected the operation designated by the first group.

The drawer FUNCTIONS 81 comprises a group of twelve keys carrying the indications F0 to F14 designating the number of the respective functions which the machine must execute, a group of two keys carrying the indications IN and OUT, respectively, a display having one LED numeral indicated IN/OUT, and a display having two LED numerals indicated FUNCTION. The keys enable the program to be introduced, as it will be seen later, the display FUNCTION indicates the number of the function which is in course of execution and the display IN/OUT indicating whether this function is switched in or switched out.

The two drawers MOTOR 82, 83 serve to control the two motors for X and Y positioning, respectively. They comprise nine keys allowing the introduction of the program for the motors and the functions of which are as follows:

OR serves to control carriage return to the origin
+N serves to advance by a given number
−N serves to return by a given number
+CR serves to effect a positive correction of the tool
−CR serves to effect a negative correction of the tool
VT serves to introduce the speed of advance
$EXT_0$, $EXT_1$, $EXT_2$ serve to take into consideration coordinates furnished by another module, for example the tape module.

The unique display having seven LED numerals, marked VALUE, indicates the numeric value of the operation in course and which has been introduced, it is repeated, by the MASTER module, for example the value of the speed of advance, the value of the correction of the tool, the value of the number +N or −N, etc.

The drawer TAPE 84 is a conventional cassette drawer but additionally comprises the electronics providing the interconnection of the drawers and the master connection with the master drawer.

The board comprises a tape drive and cassette receiving mechanism 89 and four keys.

The tape is recorded in portions which all terminate in a stop signal. These portions are called in accordance with the programming, in the desired sequences, by the master module.

The control program of the tape is introduced by the three keys at the bottom which serve:
START to control the reading, at a given sequence, of the first portion
to control the reading of the next portion
REW to control the rewinding of the tape.

The key indicated EJECT does not serve to introduce the program and does not carry any indicator; it merely serves to eject the tape cassette.

The programming is very simple; it is sufficient, for each sequence introduced into the master drawer by the keys SQ, SQ+1 or SQ−1, to type on the slave drawers the orders which relate thereto in the input sequence.

In other words, for the execution of a given workpiece, it is necessary to make a survey of the latter just as a machinist would do for operation of a conventional machine and the sentences he would then pronounce: "I will first bring the carriage to a determined position, then bore a hole with such a drill, etc . . . " serve directly to the elaboration of the program without translation into any language of computer programmers.

The program introduced passes as follows: the master drawer concerns itself with the progress of the sequences but not with the content thereof. It starts from the sequence zero and passes to the next one by incrementation or by jumps depending from the set of JUMP and of CALL, similarly to the reading of program software by a computer. At the start of each sequence, the drawer MASTER distributes the work to be effected and awaits a discharge from all the drawers at work before passing to the next sequence.

The SLAVE drawers, for their part, are concerned only with execution of the work to which they are related and under the conditions determined by the MASTER drawer in accordance with the program which has been introduced.

It is obvious that the power of such a system is tremendously high owing to its capacity and to the diversity of the work of which it is capable.

The above description points out the following advantages of the system:
Possibility of constructing control devices of diverse complexity owing to the use of a standard component (same circuit card according to FIGS. 3A and 3B) for all the drawers and also owing to the fact that each drawer added itself includes the master software necessary for conversation with the MASTER drawer.
Direct conversational connection between the slave drawers so that it is not necessary to load and unload a general memory.
Great facility for programming owing to the fact that for each sequence introduced into the MASTER drawer the operations to be executed are introduced into the SLAVE drawers and are effective for their execution.

I claim:

1. A control system for a machine or installation, comprising: a master module and several slave modules, said master module being operative for the control of said slave modules and providing information thereto and said slave modules being operative for the control of special functions, wherein each of said slave modules includes memory means for storing the portion of the software that the master module requires for conversing with the slave module and for processing said provided information; each module including: a processing circuit including a microprocessor; at least one specific function circuit; at least one logic interruption means; at least one non-volatile memory means; and at least one volatile memory means; said microprocessor, said specific function circuit, said logic interruption means, said non-volatile memory means, and said volatile memory means being interconnected by an internal address bus, an internal data bus, an internal control bus and an internal interruption bus; and each module further including an additional non-volatile memory, which in the master module only is connected by an additional bus to said internal bus, that is connected to an external master address bus and to an external master data bus to enable the master module to read said portion of software that is contained in said additional non-volatile memory.

2. A control system for a machine or installation, comprising:
(A) a master module and several slave modules, said master module being operative for the control of said slave modules and providing information thereto and said slave modules being operative for the control of special functions, wherein each of said slave modules includes memory means for storing the portion of the software that the master module requires for conversing with the slave module and for processing said provided information;
(B) a conversation bus that is bidirectional and that provides direct conversation between any two of said modules; and
(C) a master bus connected between the master module and the slave modules providing the master module to look directly in each slave module for said portion of the software contained in said memory means which it requires for conversing with that slave module;
(D) wherein each one of said slave modules comprises a processing circuit, which is identical for all the slave modules, a function memory specific to the slave module concerned and an input/output inteface which is also specific to the slave module concerned, and said master module comprises a master processing circuit, a memory for storing the conversation software common to all the slave modules, and an input/output interface; and
(E) wherein each said module is mounted separately in a drawer, the drawer including a board carrying the input/output interfaces for conversation with the operator, said board of the master module carrying a keyboard for inputting into said master module, during the introduction of a program, data relating to the sequences of said program, said keyboard including ten numeric keys for the introduction of the numerical values of all the operations effected by the slaves modules, an OPERATION display and a SEQUENCE display that respectively display, during running of the program, the master operation and the number of the sequence in operation, and wherein at least some of the slave module drawers include keys for introducing into the program the operations that must be executed by the slave module in the sequence in progress.

3. The system of claim 2 wherein the system includes a unique keyboard for conversation with the slave module.

* * * * *